AUTOMATIC TELEPHONE DIALING AND CALLING APPARATUS

Filed Feb. 24, 1964

INVENTORS
HENRY HANK KLUMB
HENRY C ROGERS
BY
Arthur H. Seidel
ATTORNEY

AUTOMATIC TELEPHONE DIALING AND CALLING APPARATUS

Filed Feb. 24, 1964 3 Sheets-Sheet 2

INVENTORS
HENRY HANK KLUMB
HENRY C ROGERS
BY Arthur H. Seidel
ATTORNEY

AUTOMATIC TELEPHONE DIALING AND CALLING APPARATUS

Filed Feb. 24, 1964 3 Sheets-Sheet 3

INVENTORS
HENRY HANK KLUMB
HENRY C ROGERS
BY
Arthur H. Seidel
ATTORNEY

United States Patent Office 3,360,612
Patented Dec. 26, 1967

3,360,612
AUTOMATIC TELEPHONE DIALING AND CALLING APPARATUS

Henry Hank Klumb and Henry C. Rogers, Philadelphia, Pa., assignors, by direct and mesne assignments, to The Teleminder Company, Philadelphia, Pa., a corporation of Pennsylvania Filed Feb. 24, 1964, Ser. No. 346,772
9 Claims. (Cl. 179—90)

In general, this invention relates to a new and improved automatic telephone calling apparatus, and more particularly to an automatic telephone calling apparatus which can be simply and easily utilized with standard telephone equipment and is useful for transmitting predetermined messages in response to control signals.

With the increase in the number of digits needed for dialing telephone numbers, and with the increased complexity of telephone equipment presently available, there is a need for simple apparatus which can be combined with standard telephone equipment for dialing predetermined telephone numbers from unitary actuators. Further, there is a need for providing automatic apparatus for calling police, firemen, or other emergency personnel in response to instantaneously received distress signals. For example, a butcher would want to be called immediately upon notice that the temperature in his meat box had risen above a predetermined temperature without the necessity of hiring a special person to continuously check for such emergency.

For all these reasons, it is the general object of this invention to provide a new and improved automatic telephone calling apparatus.

Another object of this invention is the provision of a new and better automatic telephone calling apparatus which is responsive to any type of control signal to dial a telephone number.

Still another object of this invention is the provision of a new and better automatic telephone calling apparatus which, responds to a control signal, will dial the telephone number, play a prerecorded message, then dial the second telephone number and play a second predetermined message until help is received to remedy the condition noted by the control signal.

Still another object of this invention is the provision of a new and better telephone calling apparatus which can be utilized with standard telephone equipment without injury thereto or modification thereof.

Still another object of this invention is the provision of a new and better calling apparatus which will enable the standard telephone equipment to be utilized in its normal manner when the telephone calling apparatus is not in use.

Still another object of this invention is the provision of a new and better telephone calling apparatus which is simple in manufacture and economical to use.

Other objects will appear hereinafter.

For the purpose of illustrating this invention, there is shown in the drawings a form which is presently preferred; it being understood, however, that this invention is not limited to the precise arrangements and instrumentalities shown.

Figure 1:
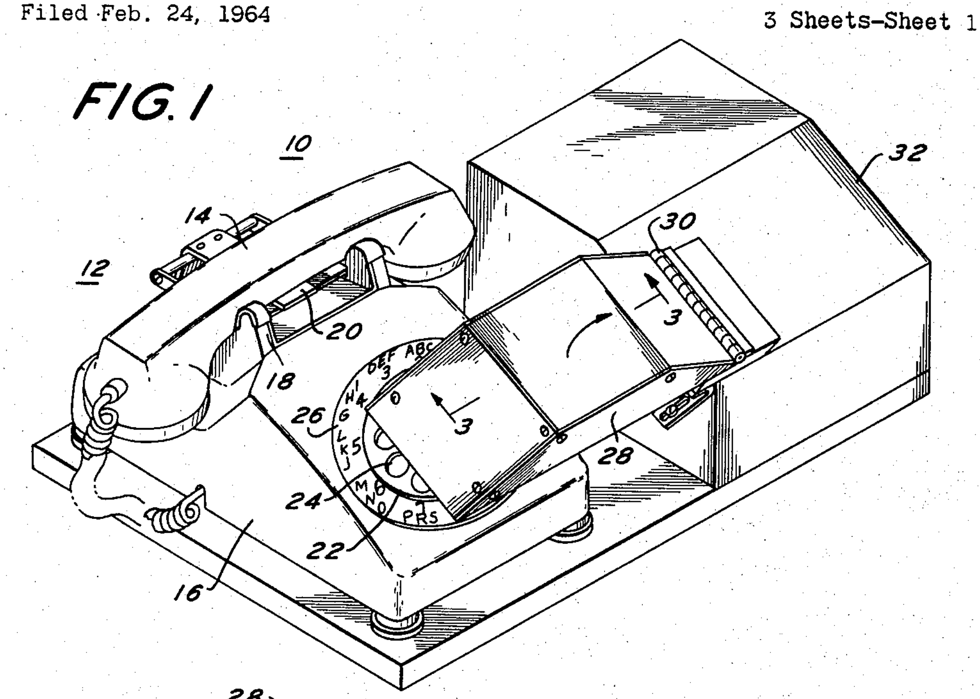
FIGURE 1 is a perspective view of the apparatus of the present invention.

In FIGURE 1, there is shown the telephone calling apparatus of the present invention generally designated by the numeral 10. The automatic telephone calling apparatus 10 comprises a standard telephone set 12 having a receiver 14 and a base 16.

The receiver 14 is lifted from the cradle 18 of the base 16 by a suitable telephone lifting mechanism 20. The telephone lifting mechanism 20 may be any standard solenoid operated lifting mechanism such as the one shown in co-pending patent application Ser. No. 320,667; filed Nov. 1, 1963, entitled Telephone Operating Attachment invented by Hank Klumb and Henry Rogers.

The base 16 has a standard rotatable spring biased dial 22 on an inclined face thereof which is normally utilized by placing one finger in the holes 24 of the rotatable dial at the numbers as indicated on the dial face 26. There are ten holes 24 in the dial 22 indicating numbers from one through nine and zero as noted on the dial face 26 running counterclockwise.

A telephone dialing head 28 is hingedly mounted over the dial 22 by a hinge 30 to a telephone signal circuit housing 32. The dialing head 28 is better shown in FIGURES 2 and 3.

Thus, the dialing head 28 includes a shaft 34 fixedly secured to a rotating clutch plate 36 through a screw 38. A free floating clutch plate 40 is axially aligned with the shaft 34 and is held in place by an end cap 42 which is secured to the shaft 34 by screw 38. End cap 42 has a reduced diameter hub portion 44 on which is placed the rotating clutch plate 36 and the free floating clutch plate 40. The free floating clutch plate 40 does not normally rotate with the clutch plate 36 and shaft 34 due to the roller bearings 46 and 48 on the upper and lower surface thereof. The free floating clutch plate 40 has a finger 50 depending from an outer peripheral portion thereof. The depending finger 50 fits within the "0" or "operator" hole 24 in the rotatable spring biased dial 22. The finger 50 has been shown in phantom in FIGURE 3 to disclose its place with respect to the free floating clutch plate 40, although the particular cross sectional view 3—3 would normally not show the finger 50.

The free floating clutch plate 40 has ten holes 52 spaced along a circular path concentric with the free floating clutch plate 40. Each of these holes 52 corresponds, in spaced relation about the free floating clutch plate 40, to the holes 24 in the rotatable spring biased dial 22. The reason for this proportional relationship will be discussed below.

The rotary clutch plate 36 has mounted on the upper face thereof an outer spring biased commutator contact 54 and an inner spring biased common contact 56.

Further, a solenoid 58 is mounted on the upper surface of the rotary clutch plate 36. It should be noted that, for purposes of the claims, the rotary clutch plate 36 can be also known as a driven member or plate, and the free floating clutch plate 40 can be defined as a free wheeling member or plate.

The solenoid 58 has two terminals (not shown) connected to the contacts 54 and 56.

Figure 3:
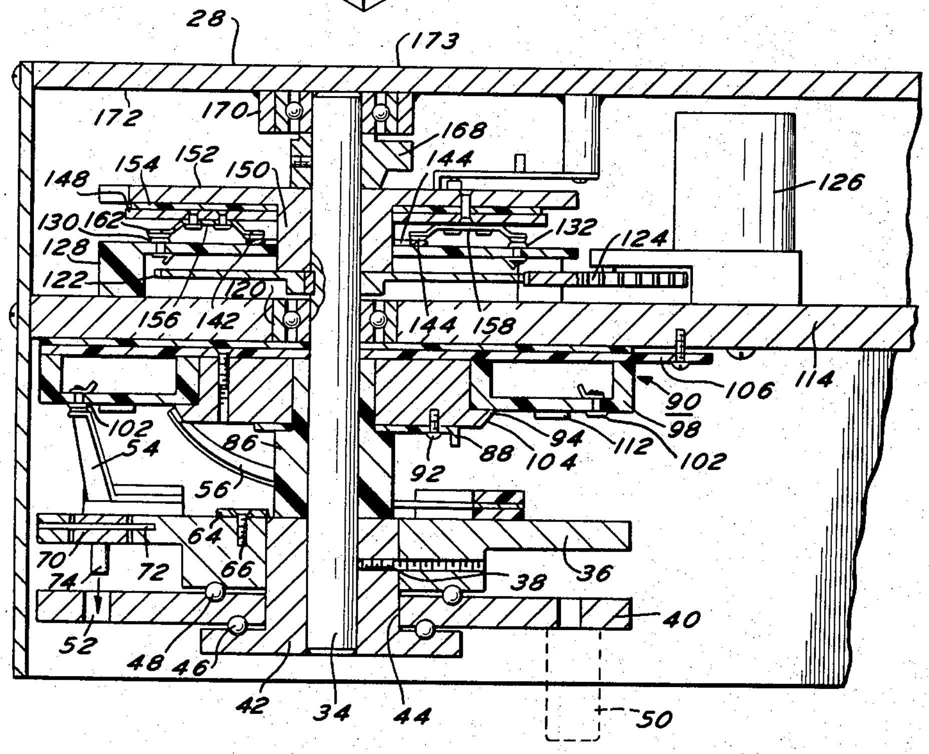
FIGURE 3 is a cross sectional view of the mechanical telephone calling head of FIGURE 1 taken along lines 3—3.
Figures 4, 5, 6:
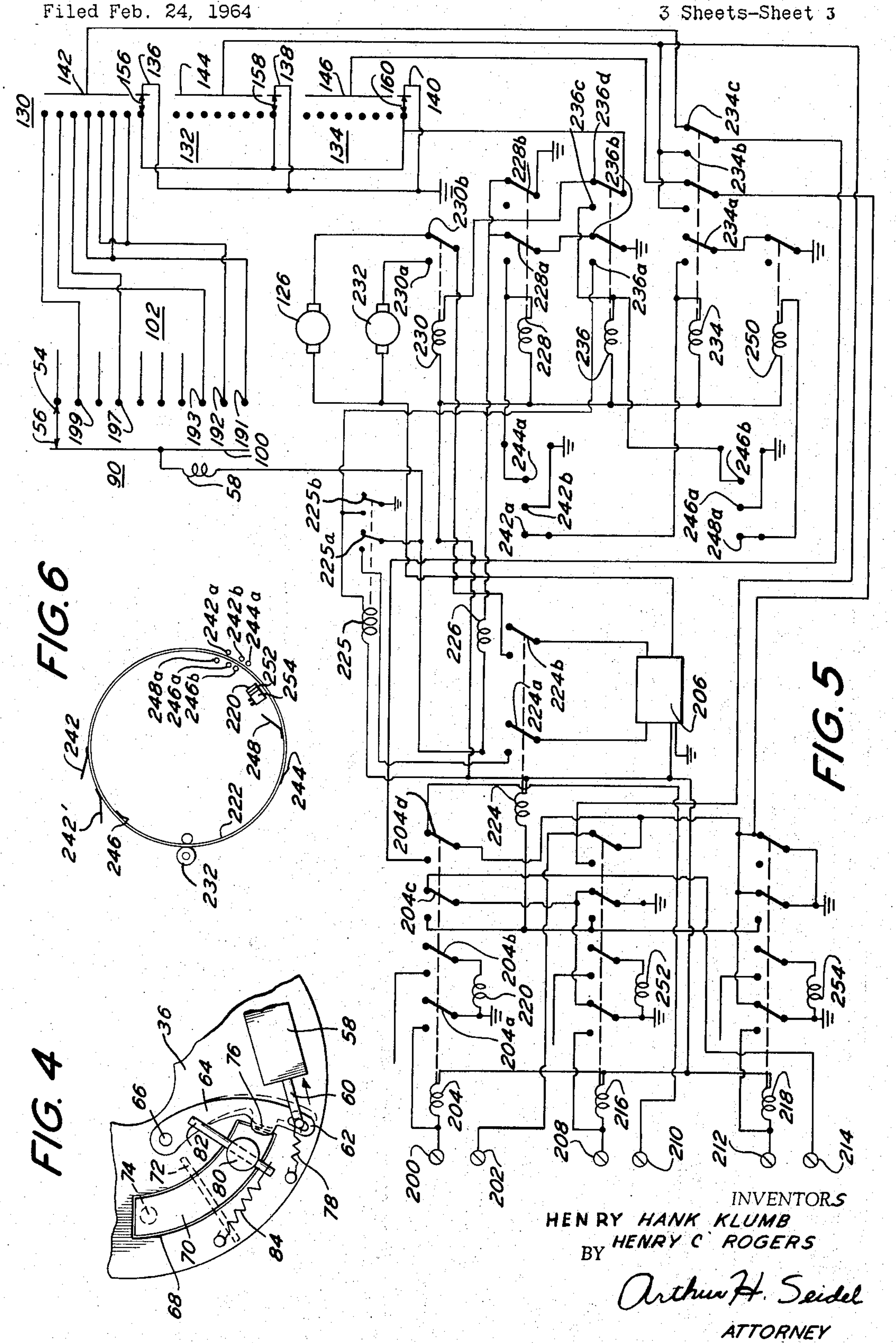
FIGURE 4 is a partial top plan view of the clutching disk actuator of the present invention.
FIGURE 5 is an electrical schematic for the apparatus of FIGURES 1–4.
FIGURE 6 is a diagrammatic showing of the endless tape utilized with the present invention.

As best shown in FIGURES 3 and 4, the solenoid 58 has an actuator rod 60 extending therefrom placed within a slot 62 in a pivoting spring biased holder arm 64. The spring biased pivoting holder arm 64 is rotatable about a pin 66 fixedly secured to the rotary clutch plate 36.

An arcuate slot 68 is formed in the rotary clutch plate 36. The arcuate slot 68 has a mean radius equal to the radius of the holes 52 in the free floating clutch plate 40. A clutch engaging rocker arm 70 is arcuate in top plan view as noted in FIGURE 4 and fits within the arcuate slot 68 being slightly smaller in all dimensions than the slot 68. The clutch engaging rocker arm 70 is pivotably mounted about a pivot pin 72. At one end of the rocker arm 70 on the underside thereof is secured a clutch pin 74 spaced from the center of the rotary clutch plate 36 a distance equal to the radius of the path of holes 52 on free floating clutch plate 40.

The pivoting spring biased holder arm 64 has an overlying extension 76 which, when positioned overlying the arcuate slot 68 prevents pivoting of the rocker arm 70 about pivot pin 72. Holder arm 64 is spring biased by a spring 78 to a position in which it tends to overlie the arcuate slot 68.

The rocker arm 70 has a cam holder 80 fixedly secured to the upper face thereof on the end opposite from clutch pin 74. The cam holder 80 is adjacent the end of rocker arm 70 which is normally engaged by extension 76 of holder arm 64. Cam holder 80 has a cam follower pin extending therethrough in the direction of the radius of the rotary clutch plate 36. The outermost end of cam follower pin 82 is connected to a spring 84 which normally biases the rocker arm to a position wherein the clutch pin 74 is moved downwardly to fit within one of the holes 52 in free floating clutch plate 40. The end cap 42, free floating clutch plate 40, and rotating clutch plate 36 can be manufactured of a non-conducting material.

A bushing 86 is provided about the shaft 34 resting on the hub 44. The bushing 86 is manufactured of an insulating material, and has supported thereon a cam track 88 for engaging the cam follower pin 82 once during each cycle of rotation of the rotary clutch plate 36. The cam track 88 is secured to an adjustable common conductor 94 by a screw 92. The commutator assembly 90 remains stationary during rotation of the shaft 34.

The commutator assembly 90 includes a common conductor support 94 mounted about the bushing 86. The common conductor support 94 is electrically conducting throughout and is connected through a suitable brush 96 to a concentric insulated commutator contact housing 98. The brush 96 is connected to a common contact 100 within the commutator contact housing 98. Further, within the insulating commutator contact housing 98 there are provided ten contacts 102 spaced about a path concentric with the path of travel of outer spring biased commutator contact 54. The inner spring biased ground contact 56 is continuously in contact with a beveled edge 104 of common conductor support 94.

Thus, it can be seen, that with energization of a particular one of the contacts 102 and contacts 100, rotation of the rotary clutch plate 36 will cause spring biased commutator contacts 54 and 56 to wipe the contacts 102 and beveled edge 104 respectively. When the spring biased commutator contact 54 hits the energized one of the contacts 102, a signal is transmitted to solenoid 58. Solenoid 58 will then retract actuator rod 60 pulling the pivoting spring biased holder arm 64 about pin 66. This moves extension 76 out of its overlying position with respect to the arcuate slot 68 and rocker arm 70. When the extension 76 clears rocker arm 70 the spring 84 causes the rocker arm 70 to pivot about pivot pin 72 dropping clutch pin 74 downward to engage the particular hole 52 in free floating clutch plate 40 which is immediately below the clutch pin 74. This completes the clutching of free floating clutch plate 40 to the rotary clutch plate 36. When pin 74 is engaged in hole 52, the dial finger 50 will then rotate the dial 22. This rotation will continue until the free floating clutch plate 40 is disengaged from the rotary clutch plate 36.

When the cam follower pin 82 reaches the position wherein it engages cam guide track 88, the cam holder 80 forces the rocker arm 70 to rotate about the pivot pin 72 until the rocker arm 70 reaches a horizontal position in which the rocker arm 70 is disposed slightly below the extension 76 of holder arm 64. Since the solenoid has been deenergized after passing the particular energized contact 102, the spring bias of spring 78 will pull the holder arm 64 about pivot 66 until extension 76 overlies rocker arm 70 latching the rocker arm 70 in place. The rotary clutch plate 36 will thus remain disengaged from free floating clutch plate 40 until outer spring biased commutator contact 54 wipes another energized contact 102. During this deenergization period, the spring biased dial 22 will have returned to its starting position. As can easily be seen, the particular number dialed will be determined by the number of contacts 102 between the particular energized contact and the point where cam follower pin 82 engages cam track 88.

The commutator assembly 90 is held together by an insulating alignment plate 106 through screws 108 securing the alignment plate 106 to the common conductor support 94 and thus sandwiching the commutator contact housing 98 in place. The alignment plate 106 has a tab 110 extending outwardly from the periphery thereof. The tab 110 enables one to adjust the position of the cam track 88. Four clamps 112 secure the commutator assembly 90 into fixed position after adjustment. Thus, the clamps 112 prevent rotation of the commutator assembly 90 so as to maintain the commutator assembly 90 stationary with respect to the rotatable clutch plate 36. An insulating sheet 118 is adhesively secured to the alignment plate 106 between the alignment plate 106 and the support 114.

The support 114 extends across the telephone dialing head 28 and is supported thereby.

The support 114 has a hole through the center thereof through which passes the shaft 34. Around shaft 34 within the support 114 there is secured a bearing race 120 which allows the shaft to rotate with respect to the support 114. Mounted above support 114 is a suitable gear 122 keyed to the shaft 34. The gear 122 is driven by a meshing smaller driving gear 124 which receives its motive power from a motor 126 mounted on the support 114 within the dialing head 28. Thus, the shaft 34 is driven by the motor 126.

Spaced above the gear 122 and fixedly supported by the support 114 is an emergency number commutator plate 128. The commutator plate 128 is manufactured of an insulating material such as Bakelite and has a plurality of contacts 130, 132, and 134 about the outer periphery thereof. Each of the groups of contacts 130, 132 and 134 consist of eight contacts equally spaced about 120° of the periphery of the commutator plate 128. The first contact of each group 130, 132 and 134 of contacts in a clockwise sense is associated with an inner radially spaced "off" contact 136, 138 and 140. The remaining contacts of each group of contacts 130, 132 and 134 is associated with an arcuate contact 142, 144 and 146. A rotatable wiper blade support 148 is mounted for rotation with the shaft 34 on a hub 150 of gear 152. The rotatable wiper blade support 148 is insulated from the gear 152 by an insulating spacer 154. The rotatable wiper blade support 148 has fixedly secured to the underside thereof three conductnig wiper blades 156, 158 and 160. The wiper blades 156, 158 and 160 have radially spaced contacts 162 and 164 for continuously wiping the contacts 130, 132, 134 and the contacts 136, 138, 140, 142, 144 and 146 respectively. The wiper blades 156, 158 and 160 are spaced 120° apart so that each of these wiper blades is connecting a similar contact of the groups of contacts 130, 132 and 134 to either the respective arcuate contacts 142, 144, 146 or the "off" contacts 136, 138 and 140.

The rotatable wiper blade support 148 is fixedly connected to the insulating spacer 154 and the gear 152 by rivets 166. The gear 152 is not fixedly secured to the shaft 34. Rather, a cam 168 is fixedly secured to the shaft 34 and mounted immediately above the gear 152. The top end of the shaft 34 rests in a suitable bearing race 170 fixedly secured to the underside 172 of the top wall of the housing 173 of the telephone dialing head 28.

The gear 152 has inclined teeth 174 in the manner of a ratchet wheel. The inclined teeth 174 are engaged by a suitable pawl 176. The pawl 176 is spring biased by a spring 178 to a pawl actuator 180. The pawl actuator 180 is pivotally connected to the underside 172 of the top wall of the housing 173. Additionally, a spring 182 extends between the pawl actuator 180 and a tongue 184 for preventing backward rotation of the ratchet wheel 152.

The pawl and ratchet arrangement described above is operative during each cycle of rotation of the shaft 34 in the following manner:

The cam 168 forces the pawl actuator 180 to pivot about its connector 186 thus moving the gear 152 one notch or tooth for each rotation of the cam. After the cam has moved the actuator 180, the spring 182 returns the pawl 176 back one tooth ready for the next movement by the cam 168. There are forty-eight teeth on the gear or ratchet wheel 152, thus the wiper blades 156, 158 and 160 will alternately provide a connection between the contacts 130, 132, 134 and their associated contacts 136, 138, 140 and 142, 144, 146. When there is no contact, or when the wiper blades 156, 158 and 160 are between adjacent contacts of contacts 130, 132, 134, the dial finger 50 is being returned to the starting position by the spring bias of the dial 22. The tongue 184 is also pivotably connected to the underside 172 of the top wall of the housing 173 by a connector 188 and prevents backward movement of the gear or ratchet wheel 152 during return of the pawl actuator 180.

Figure 2:
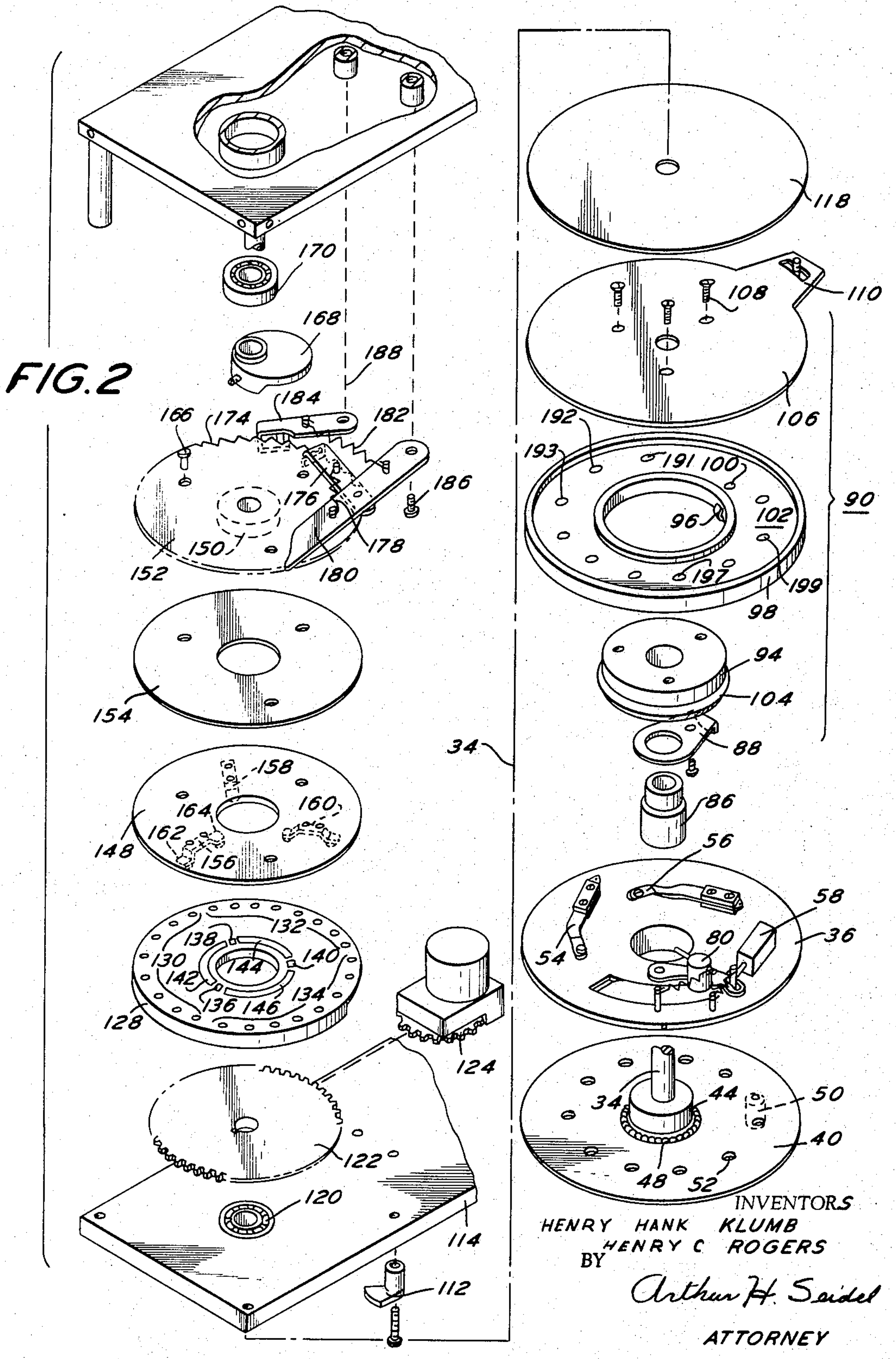
FIGURE 2 is an exploded view of the mechanical telephone calling head of the apparatus shown in FIGURE 1.

The wiring of the telephone dialing head 28 has been omitted from the showing in FIGURES 2–4 in order to more clearly present the mechanical structure. It will be understood by those skilled in the art that the contacts 54, 56, solenoid 58, contacts 130, 132, 134, 136, 138, 140, 142, 144, 146 are connected in the manner shown in the circuit diagram of FIGURE 5. Further, it should be understood that each of the groups of contacts 130, 132, 134 represents a particular telephone number which is to be automatically dialed in accordance with the principles of the present invention. For example, the telephone number associated with contacts 130 may be for the police. In this regard, the last contact in a clockwise direction of the group of contacts 130 is the "off" contact and is connected as shown in FIGURE 5 to the off contact of groups 132 and 134. The remaining seven contacts are connected directly to particular ones of the contacts 102 on the commutator assembly 90. For example, if the telephone number of the police is "937–1212" the second contact in a clockwise direction of group 130 would be connected to the last contact 191 of the contacts 102 in a clockwise direction before the cam track 88.

The third contact in a clockwise direction of the group of contacts 130 would be connected to the next to the last contact 192 of the contacts 102 in a clockwise direction from the cam track 88. The fourth contact would again be connected to contact 191 and the fifth contact would again be connected to contact 192. The sixth contact of the group of contacts 130 in a clockwise direction is connected to the seventh contact 197 before the cam track 88 in a clockwise direction.

The seventh contact of the group 130 in a clockwise direction is connected to the third contact 193 in a clockwise direction of the group 102 before the cam track 88. Lastly, the eighth contact or last contact of the group 130 is connected to the ninth contact 199 of the group of contacts 102 in a clockwise direction from the cam track 88.

The other groups of contacts 132 and 134 are similarly connected for particular numbers. For example, the group 132 will be considered to be connected for the telephone number of the home of the owner of a business establishment utilizing the automatic telephone apparatus of the present invention. The group 134 will be considered to be connected for the telephone number of the fire department.

The circuit of FIGURE 5 will be described in an integrated discussion of the particular elements thereof with the operation of the telephone calling apparatus of the present invention. Thus, with the telephone calling apparatus of the present invention connected in the manner shown in FIGURE 5 the operation is as follows:

The circuit of FIGURE 5 will be discussed with respect to a signal which indicates that the police should be called as a burglary is in progress.

Under these conditions, a burglar alarm some place in the building is tripped. This burglar alarm is operative to ground contacts 200 and 202 which are the police call input terminals. Grounding of contacts 200 and 202 energizes relay 204 from power supply 206 and operates to prevent energization of owner call relay 216 and fire call relay 218 by opening their ground circuits.

It will be noted that terminals 200 and 202 have their owner call and fire call counterparts in terminals 208, 210 and 212, 214 respectively. Similarly, terminals 208 and 212 are in series with an owner call relay 216 and a fire call relay 218 respectively.

Police call relay 204 has four switches 204*a*, 204*b*, 204*c*, and 204. Switch 204*a* is operative to latch relay 204 into the closed position. When switch 204*b* is closed it energizes the recording head 220 operative to pickup and transmit a message recorded on one track of a triple track recording tape 222. The tape 222 is on a tape recorder and is shown in FIGURE 6.

Switch 204*c*, when closed, completes the circuit to energize relay 224. Relay 224 is energized from power supply 206. Energization of relay 224 closes switches 224*a* and 224*b*. Switch 224*a* completes the circuit for the solenoid 226 of the telephone lifting mechanism 20, if relay 225 has been operated. For purposes of this discussion, relay 225 will be considered to have operated. The operation of solenoid 226 will be discussed below. The circuit is completed through switches 228*a* and 228*b* of relay 228 and switch 225*a* of relay 225.

Solenoid 226 causes the telephone lifting mechanism 20 to lift the receiver 14 out of the cradle 18. Further, closing of switch 224*a* energizes contact 100 of the commutator assembly 90.

Closing of switch 224*b* starts the dialer motor 126. This occurs because the dialer motor 126 is in series with the normally closed contact 230*b* of relay 230. Dialer motor 126 is in parallel circuit relation with tape recorder motor 232. However, when contact 230*b* is closed, contact 230*a* of relay 230 must be opened thus opening the circuit between power supply 206 and tape recorder motor 232.

The closing of switch 204*d* with the energization of the police call relay 204 grounds the common arcuate contact 142 associated with police contacts 130. This grounding circuit is completed through switch 204*d* the grounded contacts of relay 218 and the normally closed contact 234*c* of relay 234.

Since the dialer motor is now rotating, the wiping contact 156 will be ratcheted to connect grounding contact 142 to the first contact of group 130 after two rotations of the dialer motor 126. When the first contact of group 130 is bridged by contact 156, contact 192 of commutator contacts 102 is connected to ground. Thus, as wiping commutator contact 54 touches contact 192 a circuit is completed from power supply 206, through switch 224*a*, switch 225*a*, solenoid 58, contact 100, wiping contact 56 and wiping commutator contact 54 to contact 192 and thus to ground. The energization of solenoid 58 drops clutch pin 74 into the hole 52 for movement of finger 50 in the rotatable spring bias dial 22. Finger 50 will rotate dial 22 through $\frac{2}{10}$ of a revolution dialing the number "2" before clutch pin 74 is raised by action of cam track 88. During the next ratcheted rotation of dialer motor 126 wiping contact 156 will be between the first and second contacts of group 130. Accordingly, there will be no actuation of solenoid 58 as none of the contacts 102 will be grounded. Thus the finger 50 can be returned by the rotatable spring bias dial 22 to the "0" position ready for receiving the next signal. During the following rotation of dialer motor 126 the second contact in a clockwise direction of group 130 is connected to the grounded contact 142 which contact is connected to contact 191 of commutator contacts 102. Accordingly, the next number dialed will be the number "1" in the manner discussed above. This continues until contact 156 reaches off contact 138. When this occurs, relay 230 is energized through normally closed contact 236*d* of relay 236. Energization of relay 230 closes contact 230*a* and opens contact 230*b*. This shuts off dialer motor 126 and energizes tape recorder motor 232.

The tape recorder is a triple track unit having a separate recording head for each track. The police message track has a recording head 220, the owner's message track has a recording head 252, and the fire message track has a recording head 254. The tape 222 is shown in FIGURE 6 representatively and is of the continuous type, i.e. it feeds from the inside of the reel and winds on the outside of the reel and is an endless tape. For purposes of the description herein, the tape 222 is considered to be forty feet of recording tape which is moved at three and one-half inches per second by the tape recorder motor 232. The tape shown in FIGURE 6 is rotated clockwise will first play a 60 second police message through recording head 220 and transmit it into the telephone receiver 14. Thus for sixty seconds a message is transmitted to the police who have been called by the telephone dialer of the present invention. The tape 222 has on its outer surface an elongated tab 242. Tab 242 is a piece of conducting material such as aluminum foil which extends across the width of the triple track 222. At the end of the sixty second police message tab 242 will pass contacts 242*a* and 242*b*. Closing of contacts 242*a* and 242*b* latches relay 234 opening contact 234*c* and thus opening the grounding circuit for police grounding contact 142.

As contact 242 continues, it bridges contacts 242*b* and a second contact 244*a*. Grounding of contacts 242*b* and 244*a* energizes relay 228 thus opening switches 228*a* and 228*b* deenergizing the lift mechanism solenoid 226.

Relay 234, in addition to ungrounding police contact 142 latches itself into position through switch 234*a* and connects owner grounding contact 144 to ground through contact 234*b*.

The tape recorder runs for ten seconds with ten seconds as dead tape space. At the end of the dead tape space a tab 242' similar to tab 242 is positioned to insure that relays 234 and 228 have operated so that the dialer will dial the owner telephone number for the owner message. Then a second short shorting tab 246 on the inside surface of tape 222 will pass by two closely spaced contacts 246*a* and 246*b*. A second contact 248*a* is spaced from contact 246*a* a distance greater than the length of shorting tab 246 so that these two contacts are not bridged. When contacts 246*a* and 246*b* are bridged relay 236 is energized latching itself in place through contact 236*c* and the off contacts 136, 138 and 140. It will be noted that one revolution of the drive motor 136 will unlatch relay 236 and return it to its normal position.

However, relay 236, while latched, unlatches relay 228 by opening contact 236*b* and closing free floating contact 236*a*. Unlatching of relay 228 energizes lift mechanism solenoid 226 in the manner discussed previously.

Further, relay 230 is unlatched by relay 236 as contact 236*d* is opened and contact 236*c* is closed. Unlatching of relay 230 opens contact 230*a* and closes contact 230*b* thus energizing dialer motor 126 and deenergizing tape recorder motor 232. Then, the telephone number of the owner is dialed in the same manner as was the police department number discussed previously. This number has previously been programmed by connecting the contacts 132 to the proper commutator contacts 102.

When the stepper 156 reaches off contact 140, relay 230 is again latched turning off dialer motor 126 and reenergizing tape recorder motor 232. Then, a sixty second owner message related to the police department message is read by the recorder head 220. At the end of the sixty second message, a short shorting tab 244 bridges contacts 242*b* and 244*a*. It will be noted that contact 242*a* and 242*b* will not be bridged due to the length of shorting tab 244. Bridging of contacts 242*b* and 242*a* energizes relay 228 latching it in place and deenergizing telephone lifting mechanism solenoid 226. The tape recorder then runs for ten seconds dead tape.

After this, long shorting tab 248 on the inner surface of recording tape 222 shorts contacts 248*a* and 246*a*. When this occurs, relay 250 is energized unlatching relay 234 which opens contact 234*b* and closes contact 234*c* thus regrounding police message contact 142 while opening the ground circuit for owner message contact 144.

Further, long shorting tab 248 bridges contacts 246*a* and 246*b* thus reenergizing relay 236 and latching the same through the off contacts 136, 138 and 140. Relay 236 performs the functions discussed previously in that it unlatches relay 228 causing the lift mechanism solenoid 226 to be energized and unlatches relay 230 stopping tape recorder motor 232 and reenergizing dialer motor 126. Dialer motor 126 is then operative to dial the police message in the manner discussed previously.

Accordingly, as has been seen, the apparatus of the present invention has for a police signal received by grounding contacts 200 and 202 dialed the police department, played back a recorded message to the police department related to the alarm signal, dropped the receiver back into the cradle, dialed the owner, office manager, or the like, presented a recorded message to the owner or office manager or the like related to the police message, returned the receiver to the cradle, and continued the process by starting to redial the police number. This cycle will continue until aid is received. If desired, a timing switch could be placed in the circuit to shut off the unit after a predetermined number of cycles have been completed. However, by the cycling method, it is possible to be sure that even if one or both of the persons called by the apparatus have their telephone lines busy, the apparatus will continue to telephone them until someone answers and is able to receive the distress message. A different set of messages is on the second track associated with recording head 252 and a third set of messages is associated with recording head 254. The second set of messages may deal with a specific problem which only the owner and/or office manager can deal. The third track would be for the fire department and would utilize the separate recording head 254.

The relay 225 is utilized to insure lifting of the telephone receiver at the correct time when an alarm signal is first received. When one of the relays 204, 216 or 218 is energized, relay 230 is energized to start the tape recorder motor 232. The solenoid 226 and dialer solenoid 58 will not be energized until switch 225*a* closes. The tape recorder will run until tabs 246 or 248 short contacts 246*a* and 246*b* to energize relay 236. Relay 236 actuates solenoid 225 and switch 225*b* latches the solenoid in place so that switch 225*a* will remain closed.

It should be noted that actuation of alarm relay 204, 216 or 218 opens the ground circuits of the other two relays preventing their operation, such operation could jam the dialer apparatus.

The present invention may be embodied in other specific forms without departing from the spirit or essential attributes thereof and, accordingly, reference should be made to the appended claims, rather than to the foregoing specification as indicating the scope of the invention.

We claim:

1. Automatic telephone calling apparatus comprising a dialing head having a dialing finger, mounting means for mounting said head on a rotatable dial having dial holes with said dialing finger in one of the dialing holes, said dialing finger being secured to a free floating plate rotatably mounted on a shaft, a driven member fixedly secured to said shaft, said driven member being spaced from said free floating plate, selectively operable clutch means for selectively engaging said driven member with said free floating plate, a commutator assembly and contact means rotatable with said driven member, said commutator assembly and contact means being operative to energize said selectively operable clutch means at a variable predetermined point during a cycle of rotation of said driven member, and limit means operative to declutch said free floating plate from said driven member at the end of a cycle of rotation of said driven member, a commutator plate, said commutator plate having a plurality of contacts thereon each connected to a predetermined one contact on said commutator assembly, means mounting said plate for indexing movement once per revolution of said shaft, said plate contacts positioned so that one of said plate contacts is energized every two revolutions of said shaft, said plate contacts being sequentially energized, said plate contacts being in sequential groups corresponding to a plurality of telephone numbers to be dialed, each of said plate contact groups including an off contact, a control system, said off contact being operative upon energization thereof to cause said control system to stop rotation of said shaft.

2. The automatic telephone calling apparatus of claim 1 wherein said commutator assembly includes means to energize said selectively operable clutch means every other cycle of rotation of said drive member.

3. The automatic telephone calling apparatus of claim 1 wherein said selectively operable clutch means includes a latching switch, said limit means including a cam mounted adjacent the end of the cycle of rotation of said driven member, said cam being operative to release said clutch plate engaging means so that said dial is free to return to its starting position.

4. The automatic telephone calling apparatus of claim 1 wherein said plate contacts include a second group of contacts similar to said first mentioned group of contacts, said control system being operative to continuously alternate energization of said first mentioned group of contacts and said second group of contacts.

5. The automatic telephone calling apparatus of claim 4 including a first and second sensing element operatively associated through said control system with said first and second groups of plate contacts respectively, said first and second sensing elements each being operative to initiate energization of its associated group of plate contacts, and means for preventing operation of one of said sensing elements when the other of said sensing elements has been first operated.

6. The automatic telephone calling apparatus of claim 5 including audio message transmission means, said first sensing element being operative to provide a first audio message from said audio message transmission means, said second sensing element being operative to provide a second audio message from said audio message transmission means.

7. Automatic telephone calling appartus comprising a dialing head, mounting means for mounting said dialing head on a telephone dial, said dialing head being operative upon energization to rotate the telephone dial a predetermined portion of a cycle, said dialing head being operative to allow said telephone dial to return to its initial position after each energized rotation thereof, control apparatus for controlling operation of said dialing head, said control apparatus including telephone on-off means, said telephone on-off means being operative to allow audio transmission through the receiver of the telephone, said control apparatus including audio message transmission means, said audio message transmission means being operative upon operation of said telephone on-off means, first and second sensing means, said first sensing means being operative to energize said telephone on-off means, to operate said dialing head to rotate the telephone dial to call a first telephone number, to operate said audio message transmission means to transmit a first message, to deenergize said telephone on-off means in that order, said second sensing means being operative to energize said telephone on-off means, to energize said dialing head to rotate said telephone dial for a second telephone number, to energize said audio message transmission means to transmit a second message, to deenergize said telephone on-off means in that order, said first and second sensing elements being operative to prevent operation of the other of said sensing elements when one of said sensing elements is operative.

8. Automatic telephone calling apparatus of claim 7 wherein said first and second sensing elements are operative to measure first and second conditions, said first and second sensing elements being individually operative upon measurement of said first and second conditions to initiate their sequential energization cycle, said first and second sensing elements being operative to repeat their sequential cycle of energization so long as their respective first and second conditions are measured.

9. The automatic telephone calling apparatus of claim 8 including synchronizing means, said synchronizing means synchronizing the operation of said telephone lifting means with said audio message transmission means, said synchronizing means preventing operation of said automatic telephone lifting means until said audio message transmission means is at the start of a message.

References Cited

UNITED STATES PATENTS

| | | | |
|---|---|---|---|
| 2,830,119 | 4/1958 | Zimmerman | 179—90.1 |
| 2,907,828 | 10/1959 | Tegler | 179—90.1 |
| 3,062,920 | 11/1962 | Sohacki | 179—90.1 |
| 3,136,855 | 6/1964 | Provost | 179—90.1 |

KATHLEEN H. CLAFFY, *Primary Examiner.*

A. H. GESS, J. W. JOHNSON, *Assistant Examiners.*